No. 675,173. Patented May 28, 1901.
E. A. SPINK.
PROCESS OF AGING LIQUORS.
(Application filed Jan. 22, 1901.)
(No Model.)
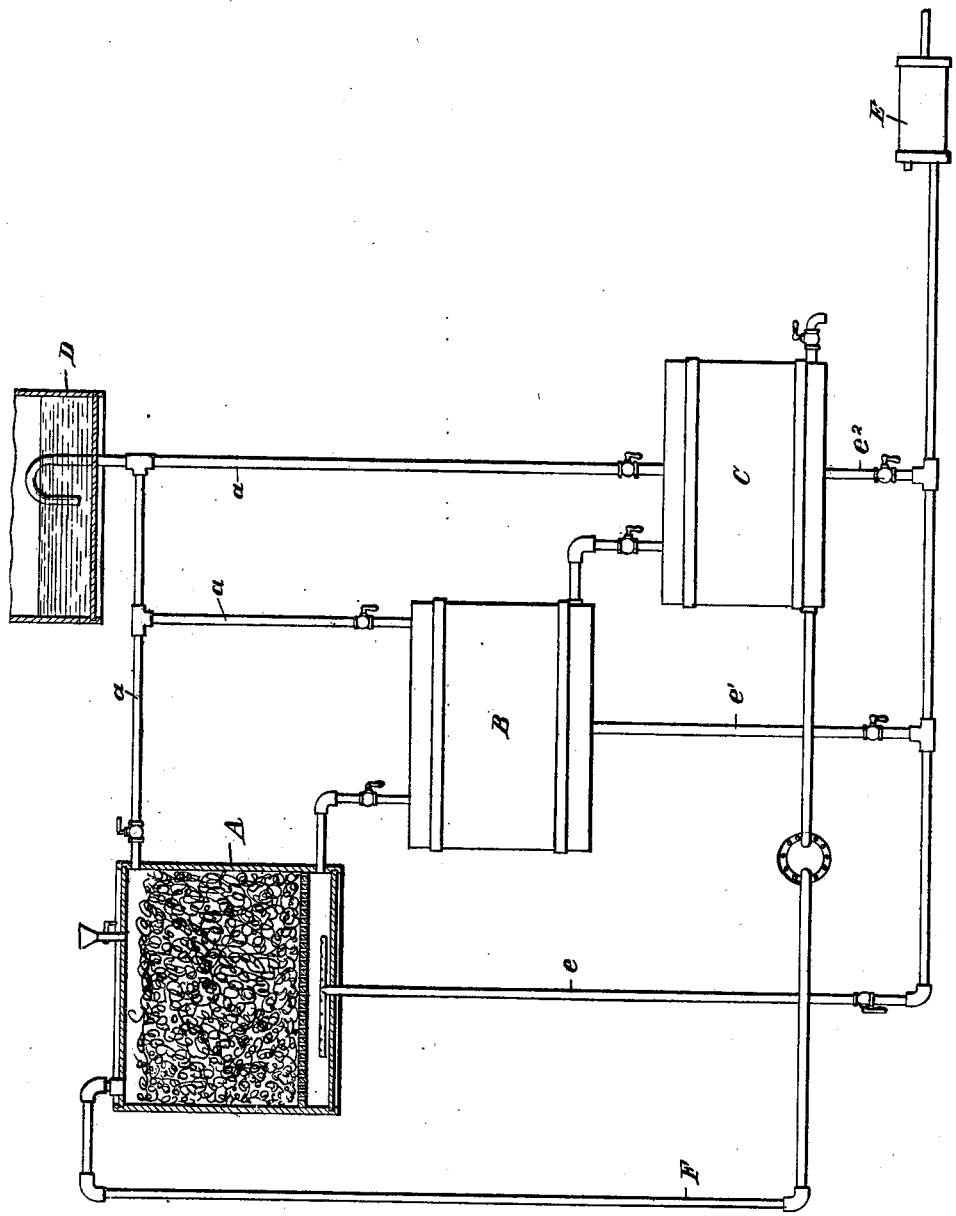
Witnesses
Inventor
Eugene A. Spink
By Thos. F. Sheridan
Attorney

UNITED STATES PATENT OFFICE.

EUGENE A. SPINK, OF CHICAGO, ILLINOIS, ASSIGNOR TO THE SPINK LIQUOR COMPANY, OF ILLINOIS.

PROCESS OF AGING LIQUORS.

SPECIFICATION forming part of Letters Patent No. 675,173, dated May 28, 1901.

Application filed January 22, 1901. Serial No. 44,243. (No specimens.)

*To all whom it may concern:*

Be it known that I, EUGENE A. SPINK, a citizen of the United States, residing at Chicago, in the county of Cook and State of Illinois, have invented certain new and useful Improvements in Processes of Aging Liquors, of which the following is a specification.

This invention relates to an improved process for aging liquors, and more particularly to an improvement on the process wherein air is employed as an agent in the treatment.

In treating alcoholic liquors for the purpose of so-called "aging" the same, especially when a method is employed wherein air is used as an active agent in the treatment or process, I have found by extensive tests and experiments that much depends upon the time interval of treatment, the particular manner of carrying out the method, and the special period of aeration or the period and extent of time in which the aeration process is carried on.

In carrying out my process any desirable form of apparatus may be employed, for which reason I have shown in the accompanying drawing a diagrammatic view of an apparatus the details of which are in the present instance unimportant.

In the various tanks or receivers (designated at A, B, and C) is placed a mass of conveniently-curled beech-shavings, although other shavings or analogous material may be employed—such as corncobs, sponge, or excelsior—and I wish it understood that where I use the term "shavings" it is intended to cover equivalent materials. The shavings are first treated with a suitable solution of sal-soda to extract all coloring material and other injurious substance—such as tannin, creosote, &c.—therein contained. They are then placed in the various tanks or receivers and held in place in any convenient manner, occupying substantially the larger portion of the interior of the tank.

I first introduce into the tank A a volume of liquor sufficient or substantially sufficient to fill the tank, thereby immersing and saturating fully and completely the entire mass or body of shavings contained in the tank. The liquor is allowed to stand in the tank in contact with the shavings for a period of approximately two hours. The treated surplus is then drawn off from the tank A and carried into tank B, in which tank it is again allowed to remain for a period of substantially two hours. It has been found that by allowing the liquor to remain for a definite time—about two hours—in contact with the treated shavings the latter absorbs or abstracts from the liquor an essential amount of fusel-oil, and, further, that the treated shavings essentially assist in the disengagement of the aldehydes. It will therefore be seen that the process is not a filtering process. After removing that portion of the liquor which has not been absorbed or which is not held by the shavings, and which I term "superfluous treated liquor," from the tank A a current of air is forcibly introduced into the tank, preferably by a pump E, communicating with the bottom of the tank through the pipe $e$, and caused to forcibly penetrate and pass through the saturated mass of shavings therein contained. This process is continued for a period of about two hours. The vapors containing objectionable aldehydes are carried off by the air and conducted through a suitable pipe $a$ into a condenser D, where they may be condensed in any convenient manner. From the tank B the superfluous treated liquor is drawn off and introduced into the tank C, the same having first remained in the tank B for a period approximating two hours, the volume of liquor being necessarily somewhat diminished, owing to the saturation of the mass of shavings, but still in each instance is amply sufficient to be conducted from one tank to the other and to completely immerse the mass of shavings contained in the subsequent tanks, though, if desired, the tanks may be of varying sizes. After the superfluous treated liquor has been drawn off from the tank B into the tank C, air is forced into the tank B through pipe $e'$ for a period approximating two hours, during which period the mass of shavings in the tank C having been immersed and thoroughly saturated is permitted to remain in its immersed state for a period approximating two hours and is then drawn off, after which air is forced in through pipe $e^2$ for a period approximating two hours.

In practice I have found that by permitting the liquor to remain in intimate contact with the shavings for a considerable period of time many of the so-called "impurities" or "objectionable qualities" thereof are absorbed by the shavings, resulting largely in the improvement of the liquor drawn off, and that by introducing air under a blast or pressure for a considerable period of time many of these impurities, especially the aldehydes, are driven off or carried away by the air-currents as they pass from the tanks into the condenser.

After the vapors have been condensed they may for a limited number of times be subsequently introduced with a fresh or subsequent charge of green liquor or low wines into the first of the series of tanks, thereby recovering those properties or portions of the condensed material which are of value.

By employing a forced draft in connection with the saturated mass important results have been obtained, and in this connection it is to be noted that the forced draft of air is not brought into direct contact with the body of liquor itself, but only in contact with the liquor held by the shavings, the forced draft serving to positively carry off the aldehydes or a very large percentage thereof and in addition serving to rehabilitate the shavings, so that they can be used with great success with a subsequent charge of liquor.

In practice I have found that good results can be obtained by extracting or pumping the treated liquor from the tank C through pipe F back into the tank A and again passing it through the series of tanks. This can be done as many times as necessary and according to the number of tanks used. In practice it has been found that from three to five circulations of the liquor produces very beneficial and a marked improvement in the results.

The air which is forced into and through the saturated mass of shavings may be heated, if desired, a temperature of 90° Fahrenheit having been found very satisfactory.

The foregoing description of the process by which the liquors are artificially aged produces very beneficial results, in that it eliminates practically all the deleterious elements, such as the fusel-oil and the aldehydes, and places the liquor in condition for very rapid maturing in packages or in tanks.

By very careful test and actual operation of the method I have found that it takes usually a period approximating two hours to fully saturate the shavings; but I wish it understood that I employ the term "sufficient to cause a full saturation" to define that period of time sufficient to properly treat the liquor, not to limit the invention to the definite term of two hours, and that the statement "sufficient to cause a full saturation" is to distinguish from a method wherein the liquor is permitted to percolate slowly through the mass or held in the mass for a short period of time—as, for instance, a few moments only— which could not result beneficially.

I claim—

1. The method of aging liquors consisting in first treating a mass of shavings to remove the coloring-matter and other foreign substances therefrom, placing the mass in a tank, immersing the same in liquor, permitting the shavings to remain in the liquor for a period of time sufficient to cause their full saturation, drawing off the superfluous liquor, forcing a draft of air through the saturated mass of shavings, cutting off the air, recharging the tank with liquor, and finally drawing off the same, substantially as described.

2. The method of aging liquors consisting in first placing a mass of shavings in a tank, immersing the same in liquor, permitting the shavings to remain in the liquor for a period of time sufficient to cause their full saturation, drawing off the superfluous liquor, forcing a draft of air through the saturated mass of shavings, cutting off the air, recharging the tank with liquor, and finally drawing off the same, substantially as described.

EUGENE A. SPINK.

Witnesses:
THOMAS F. SHERIDAN,
ANNIE C. COURTENAY.